United States Patent [19]

Kakumu et al.

[11] Patent Number: 5,178,699

[45] Date of Patent: Jan. 12, 1993

[54] PNEUMATIC TIRE

[75] Inventors: Kiichiro Kakumu, Kobe; Masaki Shiraishi, Hiroshima; Hiroyuki Nakagawa, Tsuyama; Masatoshi Tanaka, Nishinomiya; Yoshiichiro Iwahashi; Shigeaki Suzuki, both of Wako, all of Japan

[73] Assignees: Sumitomo Rubber Industries, Ltd., Hyogo; Honda Giken Kogyo Kabushiki Kaisha, Tokyo, both of Japan

[21] Appl. No.: 591,895

[22] Filed: Oct. 2, 1990

[30] Foreign Application Priority Data

Oct. 2, 1989 [JP] Japan .................. 1-258400

[51] Int. Cl.$^5$ .............................. B60C 11/11
[52] U.S. Cl. .............................. 152/209 R
[58] Field of Search .......... 152/209 R, 209 D, 209 A; D12/144–148

[56] References Cited

U.S. PATENT DOCUMENTS

| D. 170,710 | 10/1953 | Nellen | 152/209 D |
| D. 273,856 | 5/1984 | Vögler | D12/146 |
| 3,104,693 | 9/1963 | Bolenbach | 152/209 D |
| 4,412,576 | 12/1983 | Nakajima | 152/209 D |
| 4,777,993 | 10/1988 | Yamashita | 152/209 R |

FOREIGN PATENT DOCUMENTS

| 0114594 | 8/1984 | European Pat. Off. . |
| 0268436 | 5/1988 | European Pat. Off. . |
| 0306903 | 12/1988 | Japan | 152/209 R |
| 0027017 | of 0000 | United Kingdom | 152/209 R |
| 2014520 | 8/1979 | United Kingdom . |

*Primary Examiner*—Michael W. Ball
*Assistant Examiner*—Nancy T. Krawezyk
*Attorney, Agent, or Firm*—Birch, Stewart, Kolasch & Birch

[57] ABSTRACT

A pneumatic tire has a block pattern which is divided by plural circumferential grooves extending in the circumferential direction of a tire and a number of lateral grooves crossing the circumferential grooves. In the block pattern, the block circumferential/lateral ratio Lm/Wm of the average block circumferential length Lm to the average block width Wm is in a range from 0.38 to 0.55, and the block circumferential length ratio Lm/L of the average block circumferential length Lm to the circumferential length L of the tread part is in a range from 1/120 and to 1/85.

6 Claims, 3 Drawing Sheets

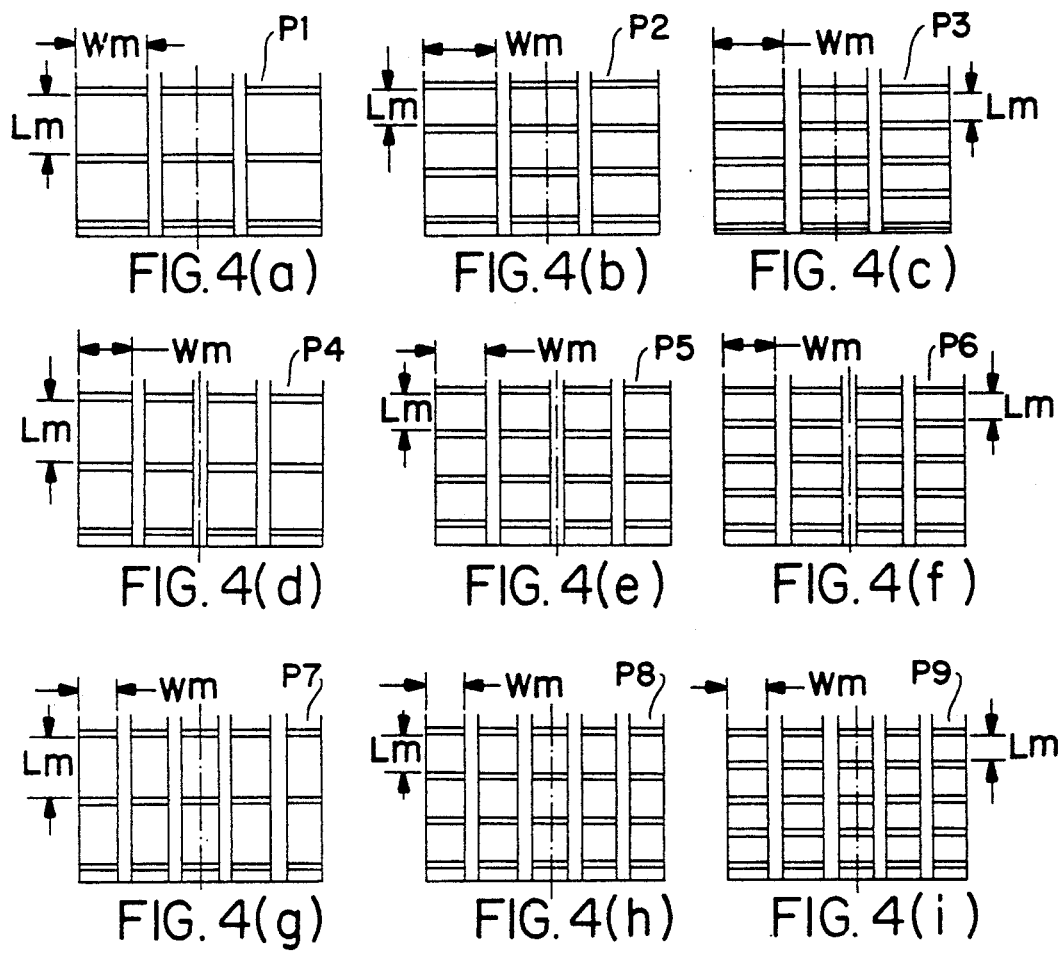
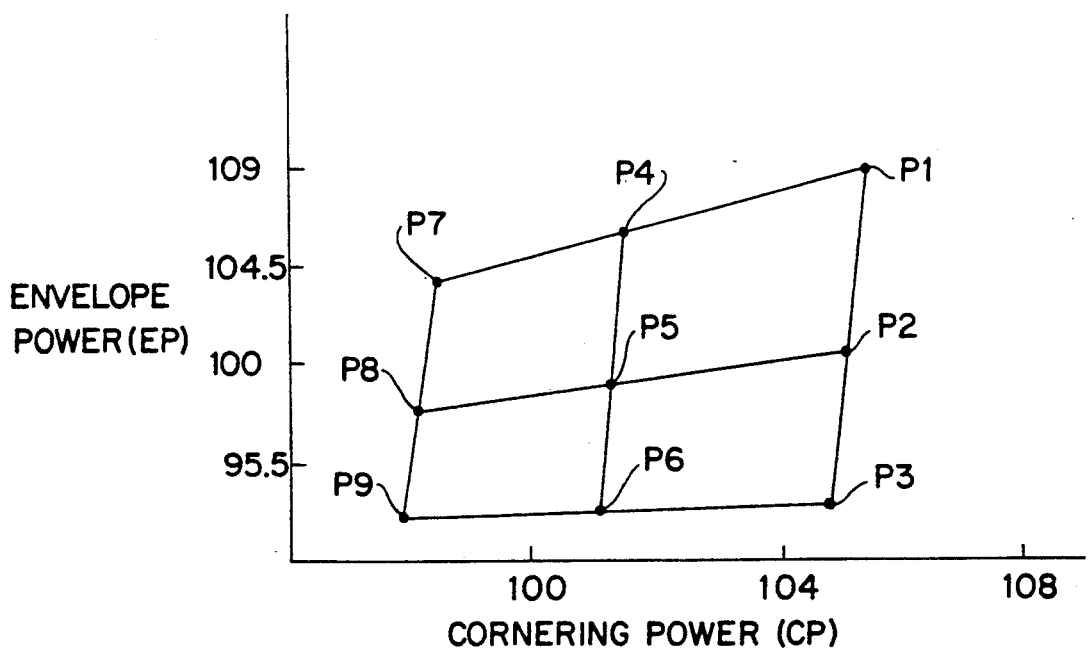

PNEUMATIC TIRE

FIELD OF THE INVENTION

The present invention relates to a pneumatic tire having tread patterns that can improve both the riding comfort and steering stability.

BACKGROUND OF THE INVENTION

In addition to the riding comfort and steering stability, improvements of the performances such as low noise characteristic and hydroplaning characteristic are demanded in a pneumatic tire. And, it is known that a tread pattern formed in the tread part is one of the factors that affect such performances.

There are such tread patterns as the lug pattern mainly composed of lateral grooves, the rib pattern mainly composed of circumferential grooves, the rib and lug pattern which intermediates the former two and the block pattern having blocks by dividing the tread part by circumferential and lateral grooves. And it is known that although, specifically, a tire having the block pattern is generally superior in characteristics against the road surface such as driving performance and hydroplaning characteristic, it is generally inferior in cornering power and wear resistance due to the relatively low rigidity of the blocks. However, in radial tires which are widely used today, as the rigidity of the treat part is increased by a belt layer having superior hoop effect, and the wear resistance and cornering power are improved by employing harder tread rubbers, tires with the block pattern are being used in high-speed buses and passenger cars.

As the applications of such tires with the block pattern are widened, however, it is required to further improve the riding comfort and steering stability of a tire without affecting the low noise characteristic and hydroplaning characteristic.

However, as the rigidity of the tread part should be generally reduced to improve the envelope performance in regard to convex run-over characteristics for the purpose of improving riding comfort, and the rigidity of the tread part should be generally increased to increase the cornering power for the purpose of improving steering stability, the riding comfort and steering stability are contradictory characteristics that could not be compatible. There has never been any suggestion for improving the riding comfort and steering stability in conventional tread patterns that could compatibly realize the two characteristics.

It is hence a primary object of the invention to provide a pneumatic tire that can improve the riding comfort and steering stability without affecting the hydroplaning and low noise characteristics, basically by mainly limiting the circumferential/lateral ratio of the blocks within a specific range.

According to one aspect of the present invention, a pneumatic tire has such tread pattern that a tread part is divided into blocks B aligned in parallel by plural vertical grooves G which extend in the circumferential direction and a number of lateral grooves g which cross the circumferential grooves G, wherein A) the block circumferential/lateral ratio Lm/Wm of 1) the average block circumferential length Lm, which is the quotient of the actual length Le in the circumferential direction, that is, the difference between the circumferential length L of the tread part and the total width Lg, $Lg = Lg_1 + \ldots + Lg_n$, of the lateral grooves g in the circumferential direction divided by the umber Ng of the lateral grooves g, to the average block width Wm, which is the quotient of the actual length We in the direction of the tire's width, that is, difference between the ground-contact width W of the tire, and the total width WG, $WG = WG_1 + \ldots + WG_n$ of the circumferential grooves G in the direction of tire's width, divided by the added number of circumferential grooves $NG+1$, that is, the number NG of the circumferential grooves G added by 1, is 0.38 in a range from 0.55 to and B) the block circumferential length ratio Lm/L, which is the ratio of the average block circumferential length Lm to the circumferential length L of the tread part, is in a range from 1/120 to 1/85.

In equation format, the above relationships are as follows:

$$Lm = Le/Ng = (L - Lg)/Ng$$

$$Wm = We/(NG+1) = (W - WG)/(NG+1)$$

$$0.38 \leq Lm/Wm \leq 0.55$$

$$1/120 \leq Lm/L \leq 1/85$$

In this invention, the block circumferential/lateral ratio Lm/WM is set to being a range from 0.38 from 0.55 to as mentioned hereinbefore. It has been obtained as the rate of the average block circumferential length Lm at which the envelope power EP can be reduced within a specific range so as to improve the riding comfort while controlling the pattern noise, to the average block width Wm at which the cornering power CP can be increased so as to improve the steering stability while controlling the reduction of the hydroplaning characteristic. Therefore, by specifying the block circumferential/lateral ratio Lm/Wm within the aforementioned range, the riding comfort and steering stability can be improved without affecting the pattern noise and hydroplaning characteristics.

In addition, the block circumferntial length ratio Lm/L is set in a range from 1/120 to 1/85.

The block circumferential length ratio Lm/L represents the rate of the average block circumferential length Lm that can reduce the envelope power EP so as to improve the riding comfort without affecting the pattern noise to the circumferential length L of the tread part. The average block circumferential length Lm can be practically determined by specifying the value and limiting it within the block circumferential/lateral ratio Lm/Wm.

DESCRIPTION OF THE PREFERRED EMBODIMENTS

Figure 1:
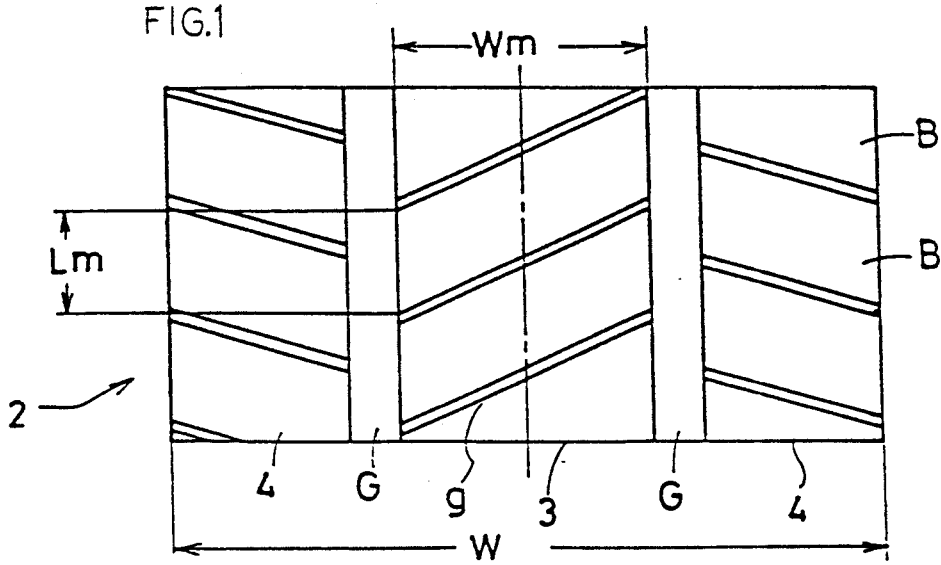
Figure 2:
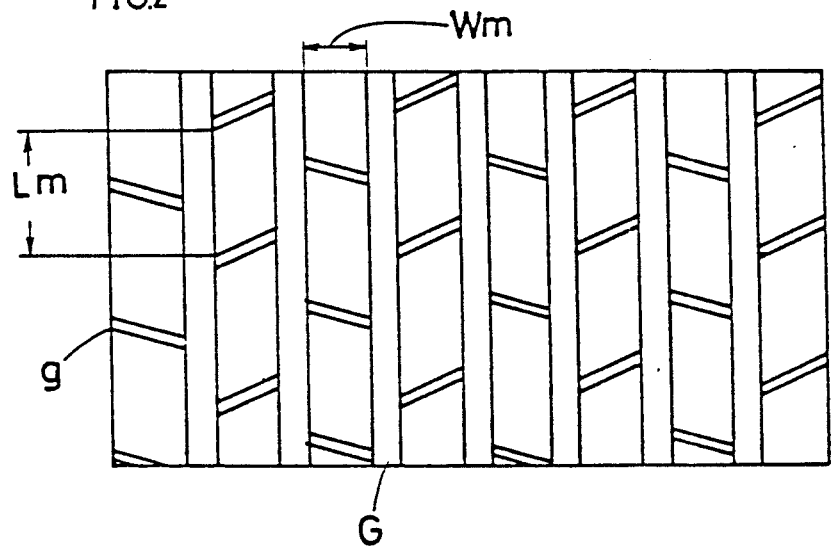
Figure 3:
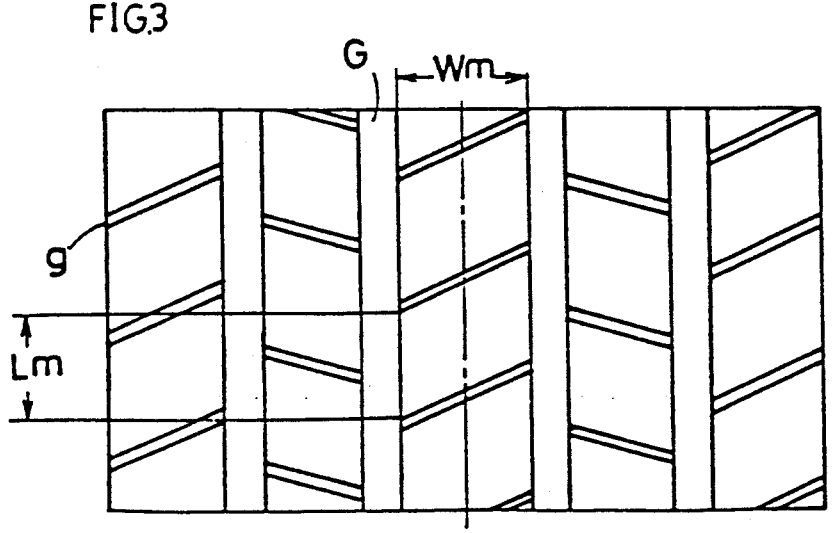
Figure 6:
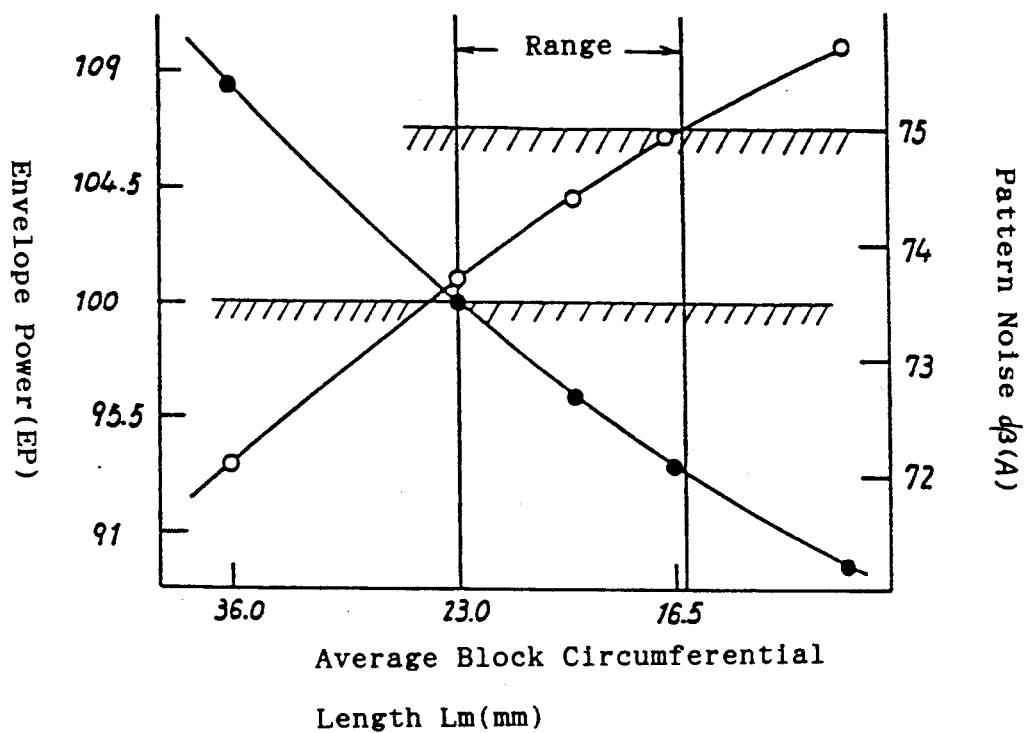
Figure 7:
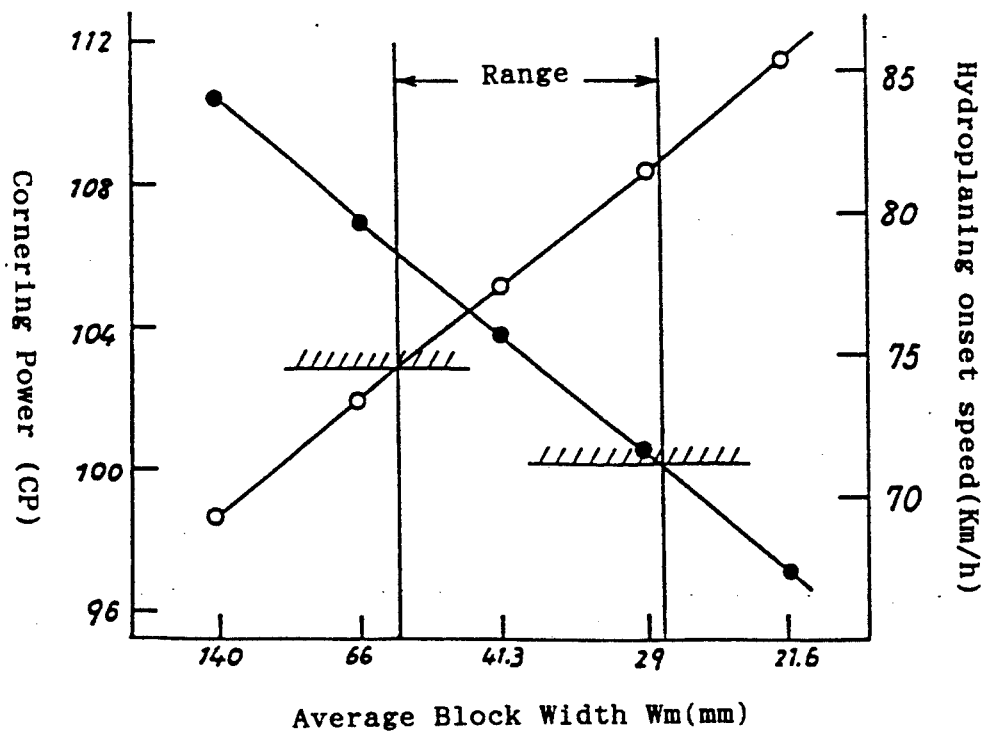

An embodiment of the present invention will now be described, by way of example, referring to the attached drawings, in which;

FIG. 1 is a plan view showing one of the embodiments of a tire's tread pattern the invention, FIGS. 2 and 3 are plan views showing examples of tread patterns in conventional tires, FIGS. 4(*a*) to (*i*) are plan views showing examples of tread patterns in the tires measured, respectively, FIG. 5 is a diagram showing the relation between the cornering power and the envelope power EP of the tires measured, FIG. 6 is a diagram showing the relation between the envelope power and the pattern noise when the average block circumferential length Lm is changed, and FIG. 7 is a diagram showing the relation among the average block width, hydroplaning characteristic and the cornering power CP.

FIG. 1 shows a ground contact surface when a tire is mounted on a standard rim, inflated with a specified internal pressure and loaded with a specified load. In FIG. 1, a tread part 2 has plural, in this embodiment, two circumferential grooves G and G extending in the circumferential direction, whereby a central rib 3 between the circumferential grooves G and G and ribs 4 and 4 between either the circumferential groove g and a side edge s of the ground contact surface are provided. And by forming a number of lateral grooves g which are aligned in parallel and which cross the circumferential grooves G, each of ribs 3 and 4 is divided into blocks B. The circumferential grooves G of the embodiment comprise straight grooves extending in the circumferential direction, and lateral grooves g are formed as inclined grooves having a narrow width and depth in comparison with the circumferential grooves G and crossing them at an angle. The circumferential grooves G can be formed as winding grooves such as zigzag and wavy forms in addition to straight grooves, and the lateral grooves can cross the circumferential grooves G orthogonally.

Furthermore, the ratio of the average block circumferential length Lm, which is the length between the walls of the adjoining lateral grooves g and g, to the average block width Wm, which is the length between the walls of adjoining circumferential grooves G and G, or circumferential groove G and the side end s, that is the block circumferential/lateral ratio Lm/Wm, is set 0.38 in a range and 0.55 to. And the block circumferential length rate Lm/L, which is the rate of the average block circumferential length Lm to the circumferential length L of the tread surface, is set at 1/120 or more and 1/85 or less.

This is based on the result of studies about the effects of tread patterns on the riding comfort and steering stability.

The riding comfort relates to the convex run-over performance, that is, the envelope performance, and the smaller the shock (envelope power EP) conducted to the axle in running over a convex, the more superior is the riding comfort.

The steering stability relates to the side force (cornering power CP) occurring in cornering.

FIG. 5 shows the measurement result of the cornering power CP and the envelope power EP by using tires having tread patterns shown in FIGS. 4(a) to (b). A tire with a tire size of 195/60R19 mounted on a standard rim (15×5½ JJ) and inflated with a specific internal pressure (1.9 kgf/cm$^2$) was employed in the measurement. In regard to the cornering power CP, the side force occurring at 1 deg. of slip angle was measured by using a dynamic tire tester.

In regard to the envelope power EP, the shock occurring in the axle was measured in running over a convex having a square sectional surface of 10 mm (H)×10 mm (W) at a peripheral velocity equivalent to 40 km/h. The measured values are shown by index setting the allowance of the cornering power CP and envelope power EP of a tread pattern P5 at 100.

In addition, the average block circumferential length Lm and the average block width Wm are 36.0 mm, 23.0 mm and 16.5 mm, and 41.3 m, 29 mm and 21.6 mm, respectively, and the tread patterns P1 to P9 are settled as their combinations. In other words, the average block width Wm is 41.3 mm in the tread patterns P1 to P3, 29 mm in the tread patterns P4 to P6 and 21.6 mm in the tread patterns P7 to P9, and the average block circumferential length Lm is 36.0 mm in the tread patterns P1, P4 and P7, 23.0 mm in the tread patterns P2, P5 and P8, and 16.5 mm in the tread patterns P3, P6 and P9.

As a smaller envelope power EP indicates superiority in riding comfort, and the stronger cornering power CP means superior or steering stability, it was found that as the cornering power CP of the tires with the tread patterns P1, P2 and P3 where the average block width Wm is 41.3 mm is stronger, they are superior in steering stability, and as the envelope power EP of the tires with the tread patterns P3, P6 and P9 where the average block circumferential length Lm is 16.5 mm is smaller, they are superior in riding comfort. Thus, as the riding comfort and the steering stability depend on the average block circumferential length Lm and the average block width Wm, respectively, the riding comfort and the steering stability depend no different dimensions of the tread pattern, and it was found, therefore, that they can be compatibly realized from the measurement result.

FIG. 6, additionally, shows a result of measuring the relation between the average block circumferential length Lm and the noise characteristic. The noise characteristic was measured at a distance of 1 m in the direction of tire's axis by loading the tire with a specific load and rotating it at a speed equivalent to 60 km/h. It was found, as recognized in FIG 6, that the envelope power EP is reversely related to the pattern noise in regard to the average block circumferential length Lm, and a preferably range of the average block circumferential length Lm to control the pattern noise at 75 dB(A) or less and the index of envelope power EP at 100 or less is in a range from 16 mm 23 mm in the average block circumferential length. Curve A illustrates the relationship between EP and Lm. Curve D illustrates the relationship between hydroplaning onset speed and Wm.

When obtaining the average block circumferential length Lm in the block circumferential length ratio Lm/L that is the ratio t the circumferential length L of the tread surface, the ratio Lm/L comes to be within a range between 1/120 and 1/85.

FIG. 7, furthermore, shows a result of measuring the relation between the hydroplaning characteristic and the average block width Wm. In regard to the hydroplaning characteristic, a speed at which hydroplaning occurs was measured by a dynamic tester.

In the average block width Wm, the hydroplaning characteristic is reversely related to the cornering power CP. And although the cornering power CP is reduced by the reduction of the average block width Wm, the hydroplaning characteristic is improved, on the contrary. Curve C illustrates the relationship between CP and Wm. Curve D illustrates the relationship between hydroplaning onset speed and Wm.

Therefore, it is recognized that an optimum range of the average block width Wm to obtain the hydroplaning characteristic of 75 km/h or higher speed and the index of cornering power CP of 100 or larger number is in a range from 28 to to 56 mm.

When the average block width Wm is obtained as the block width ratio Wm/W, that is, the ratio to the ground-contact width W of the tread in the direction of tire's width, the range of the ratio Wm/W comes to be within a range from 1/5 to 2/5.

From the measurement results shown in FIGS. 4 to 7, the range to improve both the riding comfort and the steering stability without affecting the noise characteristic and hydroplaning characteristic is as follows:

$$16 \text{ mm} \leq Lm \leq 23 \text{ mm} \quad 1$$

$$28 \text{ mm} \leq Wm \leq 56 \text{ mm} \quad 2$$

$$1/120 \leq Lm/L \leq 1/85 \quad 3$$

$$1/5 \leq Wm/W \leq 2/5 \quad 4$$

Here, the block circumferential/lateral ratio Lm/Wm, that is the ratio of the average block circumferential length Lm to the average block width Wm, can be obtained to be in a range from 0.38 to 0.55 by formulas 1 and 2.

That is, by treating the deviation of the maximum and minimum values from the center value ($\overline{Lm}/\overline{Wm} = 19.5/42 = 0.46$) in the block circumferential/lateral ratio Lm/Wm as well as the deviation of the maximum and minimum values from the center value ($\overline{Lm} = 19.5$) in the average block circumferential length Lm. The maximum and minimum values of the ratio Lm/Wm are obtained by follows:

$$Lm/Wm \ ; \ (max) = 23/19.5 \times \overline{Lm}/\overline{Wm} = 0.55$$

$$Lm/Wm \ ; \ (min) = 16/19.5 \times \overline{Lm}/\overline{Wm} = 0.38$$

It is obviously recognized that the form ratio of a block can compatibly realize the riding comfort and the steering stability without negatively affecting the other performances by regulating the block circumferential/lateral ratio Lm/Wm within the range.

Considering that, in the average block circumferential length Lm, so-called pitch variation is to be employed where the block length is changed in plural types to avoid a periodic noise, the average block circumferential length Lm can be obtained as an average quotient of the actual length Le of the tread surface in the circumferential direction, that is, the difference between the circumferential length L of the tread surface and the total width Lg of the lateral grooves g in the circumferential direction divided by the number Ng of lateral groves g.

Furthermore, considering that the circumferential grooves G may not be formed at a regular interval, the average block width Wm can be defined as an average quotient of the actual length We in the direction of tire's width, that is, the difference between the ground-contact width W of the tread and the total width WG of the circumferential grooves G in the direction of tire's width divided by the added number NG+1 of the circumferential grooves where 1 is added to the number NG of circumferential grooves G.

Moreover, the circumferential length L of the tread surface is defined as the total circumferential length of the tread part passing the tire's equator in a tire inflated with a specific internal pressure. And the ground-contact width W is defined as the maximum ground-contact width in the direction of tire's axis where the tire contacts the ground in such state that it s inflated with a specific internal pressure and loaded with a specific load. Even when a circumferential groove G is thin, it should be counted in the number NG.

Although the measurement was performed in a tire with a tire size of 195/60R15, it was confirmed that the same results were obtained in those with different tire sizes such as 025/60R15.

Thus, the block circumferential/lateral ratio Lm/Wm is the ratio f the value of the average block circumferential length Lm which reduces the envelope power EP within a specific range and improves the riding comfort while controlling the pattern noise to the average block width Wm that increases the cornering power and improves the steering stability while controlling the reduction of hydroplaning performance. Therefore, by setting the block circumferential/lateral ratio Lm/Wm within the range, a form ratio circumferential to lateral of the block B that can improve the riding comfort and steering stability without affecting the pattern noise and hydroplaning performance can be obtained.

The block circumferential length ratio Lm/L is a ratio of the block length in the circumferential length L of the tread part, that can reduce the envelope power EP and improve the riding comfort without affecting the pattern noise, and the average block circumferential length Lm in a specified tire can be determined by this range.

The block width ratio Wm/W is a ratio of the block width in the ground-contact width W, which maintains the hydroplaning performance and the cornering power CP at specified levels or higher levels, respectively. And a preferable width of the block B can be determined by this ratio.

EXAMPLES

Prototypes of tires with a tire size of 195/60R15 were produced according to the specifications shown in Table 1. After mounting the tires on a standard rim, inflating with a specific internal pressure and loading a specific load, the envelope power EP, cornering power CP, pattern noise and hydroplaning characteristic were measured in the same manner as mentioned hereinbefore, with the results being shown in Table 1. In addition, the tires were employed on all wheels of a passenger car (2000 cc), and the evaluation result of riding comfort and steering stability by the driver's feeling was shown as well. Moreover, as comparison examples, conventional tires with tire patterns shown in FIGS. 2 and 3 were produced, and the measurement result in the same manner is also presented in Table 1.

It is known that a tire of the invention, as shown in Table 1, improves the riding comfort and the steering stability by reducing the envelope power EP and increasing the cornering power CP without negatively affecting the noise pattern and hydroplaning characteristics.

TABLE 1

| FIG. | Embodiment 1 | Comparison example 1 2 | Comparison example 2 3 |
|---|---|---|---|
| Circumferential length of the tread part L (mm) | 1940 | 1940 | 1940 |
| Ground-contact width (mm) | 140 | 140 | 140 |

TABLE 1-continued

| FIG. | Embodiment 1 | Comparison example 1 2 | Comparison example 2 3 |
|---|---|---|---|
| Number of circumferential grooves NG | 2 | 7 | 4 |
| Width of the circumferential groove (mm) | 10 | 5 | 8 |
| Number of lateral grooves Ng | 90 | 60 | 60 |
| Width of the lateral groove (mm) | 2 | 3 | 3 |
| Average block circumferential length Lm (mm) | 19.56 | 29.33 | 29.33 |
| Average block width Wm (mm) | 40 | 13.13 | 21.6 |
| Block circumferential/lateral ratio Lm/Wm | 0.49 | 2.23 | 1.36 |
| Block circumferential ratio Lm/L | 1/99.2 | 1/66.1 | 1/66.1 |
| Block width ratio | 0.29 | 0.09 | 0.15 |
| Envelope power EP | 218 kgf (98) | 227 kgf (100) | 232 kgf (102) |
| Conering power CP | 126 kgf/deg (115) | 110 kgf/deg (115) | 118 kgf/deg (107) |
| Pattern noise | 73.6 dB(A) | 73.9 dB(A) | 74.5 dB(A) |
| Hydroplaning occurrence speed | 79 km/h (100) | 79 km/h (100) | 84 km/h (106) |
| Steering feeling evaluation | 3.5 | 3.0 | 3.5 |
| Riding comfort feeling evaluation | 3.5 | 3.0 | 2.5 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pneumatic tire comprising a tread,
   said tread having a tread surface and being provided with a plurality of substantially straight circumferential grooves (G) extending parallel to the tire equator in the circumferential direction of the tire and a plurality of substantially straight lateral grooves (g) crossing said plurality of circumferential grooves (G) so as to divide said tread into a plurality of substantially parallelogram shaped blocks in a plurality of circumferential rows, the number of said plurality of circumferential rows being the number (NG) of said plurality of circumferential grooves added by 1,
   the quotient (Lm/Wm) of an average block circumferential length (Lm) divided by an average block width (Wm) being in a range from 0.38 to 0.55, said average block circumferential length (Lm) being defined as the quotient of the difference (L-Lg) of the circumferential length (L) of said tread surface of the total circumferential width (Lg) of said plurality of lateral grooves in the circumferential direction, divided by the number (Ng) of said plurality of lateral grooves in the circumferential direction, said the average block width (Wm) being defined as the quotient of the difference (W-WG) of the ground-contact width (W) of said tread from the total axial width (WG) of said plurality of circumferntial grooves, divided by the number (NG) of said plurality of circumferential grooves added by 1, and
   the quotient (Lm/L) of said average block circumferential length (Lm) divided by said circumferential length (L) of the tread surface, being in a range from 1/120 to 1/85.

2. The pneumatic tire according to claim 1, wherein the block width quotient (Wm/W) of said average block width (Wm) to said ground-contact width (W) is in a range from 1/5 to 2/5.

3. The pneumatic tire according to claim 1, wherein said number (NG) of the circumferential grooves (G) is two.

4. The pneumatic tire according to claim 1, wherein the pitches of said plurality of lateral grooves are varied so that said blocks in said rows have a plurality of different circumferential lengths.

5. The pneumatic tire according to claim 1, wherein the tire size is 195/60R15, said average block circumferential length (Lm) is in a range from 16 mm to 23 mm, and said average block width (Wm) is in a range from 28 mm to 56 mm.

6. The pneumatic tire according to claim 1, wherein the tire size is 205/60R15.

* * * * *